(12) United States Patent
Miller et al.

(10) Patent No.: US 12,365,463 B2
(45) Date of Patent: *Jul. 22, 2025

(54) FLIGHT INFORMATION SYNCHRONIZATION USING AD HOC NETWORKING

(71) Applicant: Foreflight LLC, Houston, TX (US)

(72) Inventors: Jason Miller, Austin, TX (US); Krista Miller, Austin, TX (US); Sebastian Peleato, Austin, TX (US)

(73) Assignee: Foreflight LLC, Houston, TX (US)

( * ) Notice: Subject to any disclaimer, the term of this patent is extended or adjusted under 35 U.S.C. 154(b) by 545 days.

This patent is subject to a terminal disclaimer.

(21) Appl. No.: 17/718,943

(22) Filed: Apr. 12, 2022

(65) Prior Publication Data

US 2022/0234740 A1 Jul. 28, 2022

Related U.S. Application Data

(63) Continuation of application No. 16/580,902, filed on Sep. 24, 2019, now Pat. No. 11,325,710.

(51) Int. Cl.
*B64D 11/00* (2006.01)
*G06F 8/65* (2018.01)
*H04N 21/214* (2011.01)
*H04W 56/00* (2009.01)
*H04W 84/18* (2009.01)

(52) U.S. Cl.
CPC .... *B64D 11/00155* (2014.12); *B64D 11/0015* (2013.01); *G06F 8/65* (2013.01); *H04N 21/2146* (2013.01); *H04W 56/002* (2013.01); *H04W 84/18* (2013.01)

(58) Field of Classification Search
CPC ..... B64D 11/00155; G06F 8/65; G07C 5/008; H04N 21/2146; H04W 56/002; H04W 84/18; H04L 2209/80; G08G 5/06; G08G 5/0013; G08G 5/0021; G08G 5/0052
See application file for complete search history.

(56) References Cited

U.S. PATENT DOCUMENTS

| | | | |
|---|---|---|---|
| 5,265,024 A | 11/1993 | Crabill | |
| 6,317,659 B1 | 11/2001 | Lindsley | |
| 7,802,724 B1 | 9/2010 | Nohr | |
| 9,997,080 B1 | 6/2018 | Chambers | |
| 10,614,392 B1 | 4/2020 | Mottram | |
| 2005/0232185 A1 | 10/2005 | Hudson | |
| 2011/0038311 A1 | 2/2011 | Marin | |
| 2017/0320589 A1* | 11/2017 | Moravek | G08G 5/065 |

* cited by examiner

*Primary Examiner* — Kostas J Katsikis
(74) *Attorney, Agent, or Firm* — Alleman Hall & Tuttle LLP

(57) ABSTRACT

A method for flight information synchronization using ad hoc networking involves enabling a broadcast of an update to a passenger device from a pilot device, determining an update frequency for the broadcast of the update from one or more network thresholds, and determining to broadcast the update when the broadcast is enabled and one or more broadcast thresholds are satisfied. The method further involves generating the update, which includes an estimated time of arrival (ETA), and broadcasting the update by switching between an infrastructure mode and an ad hoc mode and transmitting the update via the ad hoc mode. The update is received by and displayed on the passenger device.

20 Claims, 7 Drawing Sheets

System 100

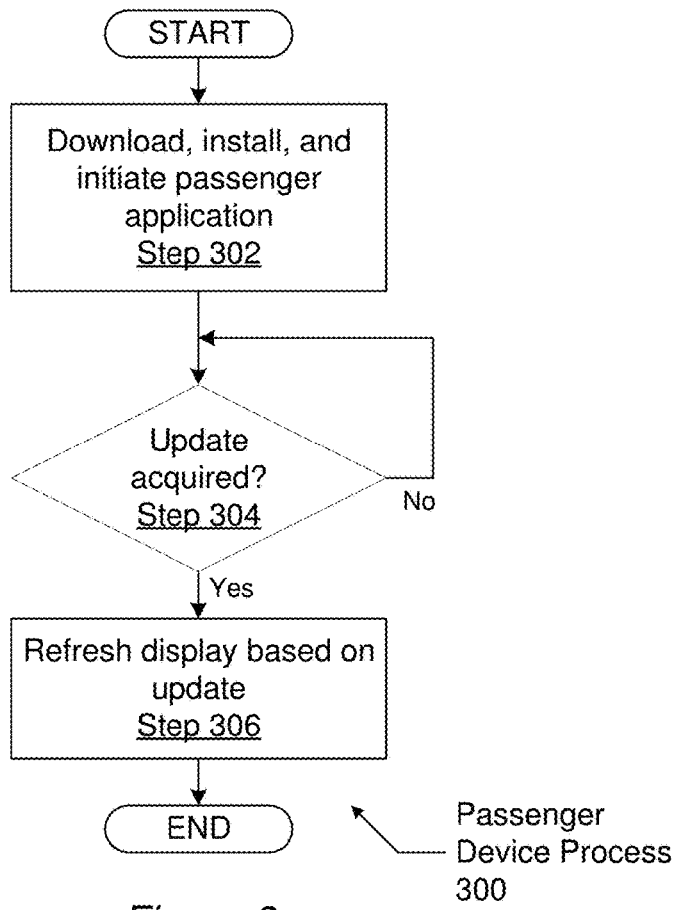
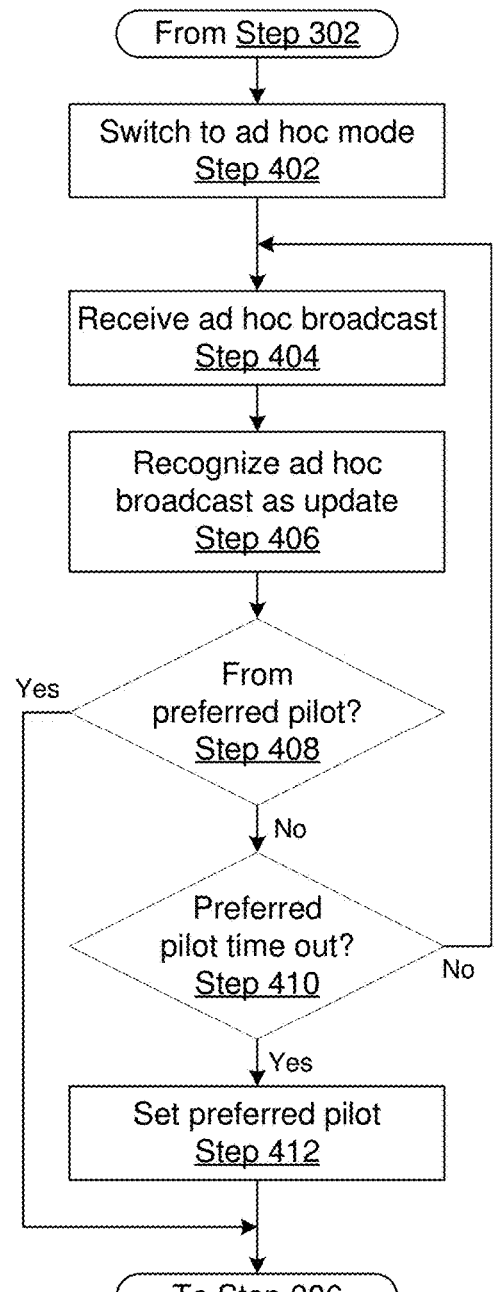
Figure 3
Figure 4

FLIGHT INFORMATION SYNCHRONIZATION USING AD HOC NETWORKING

RELATED APPLICATIONS

This application is a continuation of and claims benefit under 35 U.S.C. § 120 of U.S. application Ser. No. 16/580,902, filed Sep. 24, 2019, the entirety of which is hereby incorporated by reference.

BACKGROUND

Modern aircraft and computer systems provide a wealth of tools and resources to plan and monitor flights. Pilot applications running on the computing devices of pilots are used by pilots to plan routes and view flight information. The route information and flight information are difficult for passengers to acquire and display with their own devices.

SUMMARY

In general, in one aspect, one or more embodiments relate to a method comprising: enabling a broadcast of an update to a passenger device from a pilot device; determining an update frequency for the broadcast of the update from one or more network thresholds; determining to broadcast the update when the broadcast is enabled and one or more broadcast thresholds are satisfied; generating the update, wherein the update includes an estimated time of arrival (ETA); and broadcasting the update by switching between an infrastructure mode and an ad hoc mode and transmitting the update via the ad hoc mode, wherein the update is received by and displayed on the passenger device.

In general, in one aspect, one or more embodiments relate to a method comprising: switching, by a passenger application, to an ad hoc mode to receive an update from a pilot device for the passenger application; receiving an ad hoc broadcast; recognizing the ad hoc broadcast as the update from the pilot device without configuring the passenger application with information identifying the pilot device; generating, by the passenger application, display information that includes route information generated from the update; and refreshing, by the passenger application, a user interface on the passenger device with the display information, wherein in the user interface displays a map, a route with one or more segments, and an estimated time of arrival (ETA).

In general, in one aspect, one or more embodiments relate to a system that forms a pilot device, comprising: a processor; a memory coupled to the processor; the memory comprising a pilot application that executes on the processor, uses the memory, and is configured for: enabling a broadcast of an update to a passenger device from the pilot device; determining an update frequency for the broadcast of the update from one or more network thresholds; determining to broadcast the update when the broadcast is enabled and one or more broadcast thresholds are satisfied; generating the update, wherein the update includes an estimated time of arrival (ETA); and broadcasting the update by switching between an infrastructure mode and an ad hoc mode and transmitting the update via the ad hoc mode, wherein the update is received by and displayed on the passenger device.

Other aspects of the disclosure will be apparent from the following description and the appended claims.

BRIEF DESCRIPTION OF DRAWINGS

FIG. 2, FIG. 3, FIG. 4, and FIG. 5 show flowcharts in accordance with disclosed embodiments.

DETAILED DESCRIPTION

Figure 1:
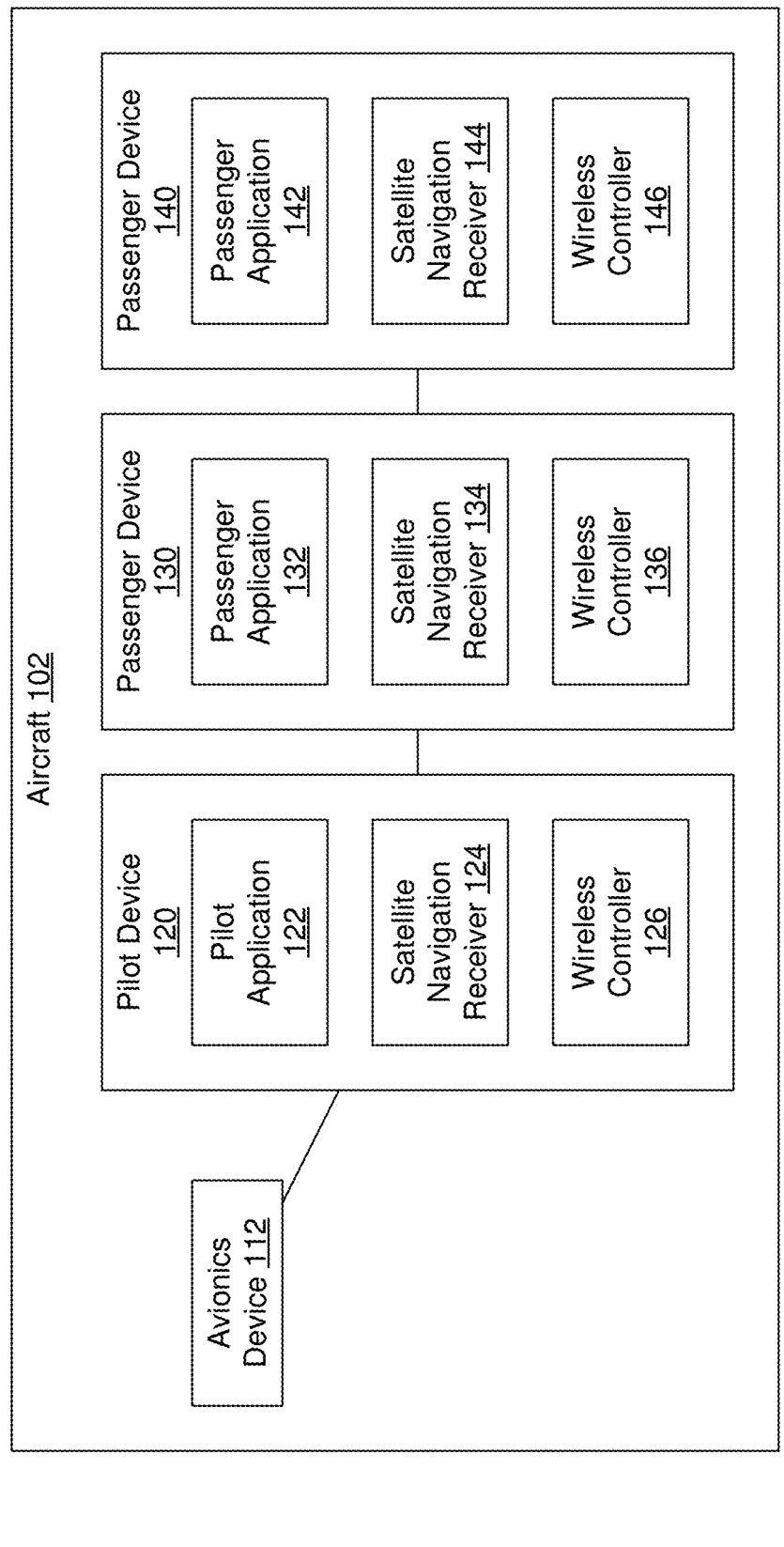
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments are directed to broadcasting updates from a pilot device to passenger devices. A pilot may allow the passengers of an aircraft to receive and display route information and flight information using passenger devices. The pilot installs a pilot application that is used to plan routes and optionally receive flight information from the avionics systems of the aircraft. After enabling the broadcasts, the pilot application may switch between an infrastructure wireless networking mode (i.e., "infrastructure mode") and an ad hoc wireless networking mode (i.e., "ad hoc mode") to broadcast updates using the ad hoc mode. The updates include route information and flight information that has been processed by the pilot application. The passengers may install a passenger application that receives the updates (route and flight information) from the pilot device without having to configure the passenger application.

FIG. 1 shows a diagram of embodiments that are in accordance with the disclosure. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

The system (100) synchronizes flight information using ad hoc networking. The system (100) includes the aircraft (102). Components within the system (100) may communicate using standard wireless local area network protocols, such as the protocols defined by the Institute of Electrical and Electronics Engineers (IEEE) 802.11 standard for Wi-Fi networks. Additional communication standards may be used.

The aircraft (102) is a vehicle that transports people and/or cargo through the air. In one or more embodiments, the aircraft (102) is a machine that flies by countering the force of gravity using one or more lift components including wings, propellers, airfoils, and engines. Examples of the aircraft (102) include airplanes, helicopters, airships, blimps, gliders, paramotors, and hot air balloons. In additional embodiments, the aircraft (102) may be a land-based, water-based, or space-based vehicles for transporting people and cargo.

The aircraft (102) includes several devices that may be attached to the aircraft (102) including the avionics device (112). The aircraft (102) may also include one or more devices from the occupants who are inside of the aircraft, including: the pilot device (120), the passenger device (130), and the passenger device (140). The aircraft (102) may be occupied by one or more people that are pilots and passengers.

The avionics device (112) represents one or more electronic systems used within the aircraft (102) and may be integrated into the aircraft or portable. The electronic systems used within the aircraft (102) may include one or more communication systems, navigation systems, monitoring systems, aircraft flight control systems, fuel systems, collision avoidance systems, flight recorders, weather systems, aircraft management systems, etc. As an example, the avionics device (112) may include an automatic dependent surveillance-broadcast (ADS-B) receiver with an integrated Wi-Fi access point that receives air traffic and weather information and that broadcasts the air traffic and weather information to other devices through the Wi-Fi access point using the infrastructure mode. This device may be integrated into the aircraft or portable.

As another example, the avionics device (112) may include an airborne internet device that provides internet access for other devices within the aircraft (102). The airborne internet device sends and receives communication signals that may be ground based or satellite based transfer data to and from the internet. In one or more embodiments, the airborne internet device includes a Wi-Fi access point through which the other devices (e.g., the pilot device (120), the passenger device (130), the passenger device (140), etc.) in the aircraft (102) connect to the internet using the infrastructure mode. This device may be integrated into the aircraft or portable.

The pilot device (120) is a computing system that is used by a pilot of the aircraft (102). In one or more embodiments, the pilot device (120) is a mobile device, such as a smartphone or a tablet computer, embodiments of which are further described below as computing system (800) in FIG. 8. In one or more embodiments, the pilot device (120) includes the pilot application (122), the satellite navigation receiver (124), and the wireless controller (126). In one or more embodiments, the pilot device (120) wirelessly broadcasts information received from the avionics device (112) to the passenger device (130). In one or more embodiments, the pilot device (120) uses one or more modes to communicate with the other devices within the aircraft (102). For example, the pilot device (120) may communicate with the avionics device (112) using an infrastructure mode and the pilot device (120) may communicate with the passenger device (130) using an ad hoc mode. In one or more embodiments, the satellite navigation receiver (124) may be external to the pilot device (120).

The pilot application (122) is a collection of one or more computer programs that operate through the pilot device (120). In one or more embodiments, the pilot application (122) receives flight information from the avionics device (112), displays the flight information, and broadcasts the flight information, which may then be received by other devices, including the passenger device (130).

The satellite navigation receiver (124) receives satellite signals and identifies the location of the pilot device (120). The satellite navigation receiver (124) may receive satellite signals from one or more satellite systems, including the Global Positioning System (GPS) from the United States, the Global Navigation Satellite System (GLONASS) from Russia, the BeiDou Navigation Satellite System (BDS) from China, the Galileo satellite navigation system from the European Union, etc. From the received satellite signals, the satellite navigation receiver (124) generates longitude, latitude, and altitude information that corresponds to the position of the pilot device (120), which may be broadcast to other devices.

The wireless controller (126) is a wireless network interface controller that connects to wireless radio based computer networks. In one or more embodiments, the wireless controller (126) operates according to a wireless communication standard to communicate with access points using the infrastructure mode and to communicate with other wireless devices using the ad hoc mode.

In the infrastructure mode, the wireless controller (126) needs a wireless access point (e.g., a wireless access point of the avionics device (112)) and data is transferred using the access point as the central hub. The wireless nodes in the infrastructure mode network are connected to access points. Nodes connecting to the same access point may share the same keys and other authentication parameters.

In the ad hoc mode, the wireless controller (126) does not require an access point. Rather, the wireless controller (126) may interface with other wireless nodes directly using the same channel and service set identifier (SSID). For example, using the ad hoc mode, the wireless controller (126) of the pilot device (120) may connect directly to the wireless controller (136) of the passenger device (130). Using the ad hoc mode forms a wireless ad hoc network (WANET) or Mobile ad hoc network (MANET), which is a decentralized type of wireless network. In one or more embodiments, using the ad hoc mode does not rely on a pre-existing infrastructure, such as routers and access points. Instead, each node of the network (e.g., the pilot device (120), the passenger device (130), the passenger device (140), etc.) participates in the routing of data through the network by forwarding data for the other nodes of the network. The determination of which nodes forward data is made dynamically on the basis of network connectivity and the routing algorithm in use. Additionally, broadcasts using the ad hoc mode may be received by any device that is listening for ad hoc broadcasts.

The passenger device (130) is a computing system that is used by a passenger of the aircraft (102). In one or more embodiments, the passenger device (130) is a mobile device, such as a smartphone or a tablet computer, embodiments of which are further described below as computing system (800) in FIG. 8. In one or more embodiments, the passenger device (130) includes the passenger application (132), the satellite navigation receiver (134), and the wireless controller (136). In one or more embodiments, the passenger device (130) wirelessly receives information from the pilot device (120). In one or more embodiments, the passenger device (130) uses one or more modes to communicate with the other devices within the aircraft (102). For example, the passenger device (130) may communicate with the avionics device (112) using the infrastructure mode and the passenger device (130) may communicate with the pilot device (120) and the passenger device (140) using the ad hoc mode. In one or more embodiments, the satellite navigation receiver (134) may be external to the passenger device (130).

The passenger application (132) is a collection of one or more computer programs that operate through the passenger device (130). In one or more embodiments, the passenger application (132) receives flight information from the pilot device (120) and displays the flight information. Additionally, the passenger application (132) may broadcast subsequent updates with the flight and route information to other devices, including the passenger device (140). In one or more embodiments, the flight information from the pilot device (120) is received and subsequently broadcasted after switching the passenger device (130) from the infrastructure mode to the ad hoc mode for wireless networking, which may be performed by sending a command to the wireless controller (126).

The satellite navigation receiver (134) and the wireless controller (136) are similar to the satellite navigation receiver (124) and the wireless controller (126) of the pilot device (120). The satellite navigation receiver (134) generates navigation coordinates from satellite signals and the wireless controller (136) connects to wireless radio based computer networks within the aircraft (102).

The passenger device (140) is a computing system that is used by a passenger of the aircraft (102). In one or more embodiments, the passenger device (140) is a mobile device, such as a smartphone or a tablet computer, embodiments of which are further described below as computing system (800) in FIG. 8. In one or more embodiments, the passenger device (140) may be referred to as a subsequent passenger device that receives a subsequent update from the passenger device (130). In one or more embodiments, the passenger device (140) includes the passenger application (142), satellite navigation receiver (144), and the wireless controller (146). In one or more embodiments, the passenger device (140) wirelessly receives information from the passenger device (130) using the ad hoc mode.

The passenger application (142), the satellite navigation receiver (144), and the wireless controller (146) are similar to the passenger application (132), the satellite navigation receiver (134) and the wireless controller (136) of the passenger device (130). The passenger application (142) receives flight information from the passenger device (130) and displays the flight information. The satellite navigation receiver (144) generates navigation coordinates from satellite signals. The wireless controller (146) connects to wireless radio based computer networks within the aircraft (102).

FIG. 2 through FIG. 5 show flowcharts of methods in accordance with one or more embodiments of the disclosure for flight information synchronization using ad hoc networking. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven in accordance with one or more embodiments. By way of an example, determination steps may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

Figure 2:
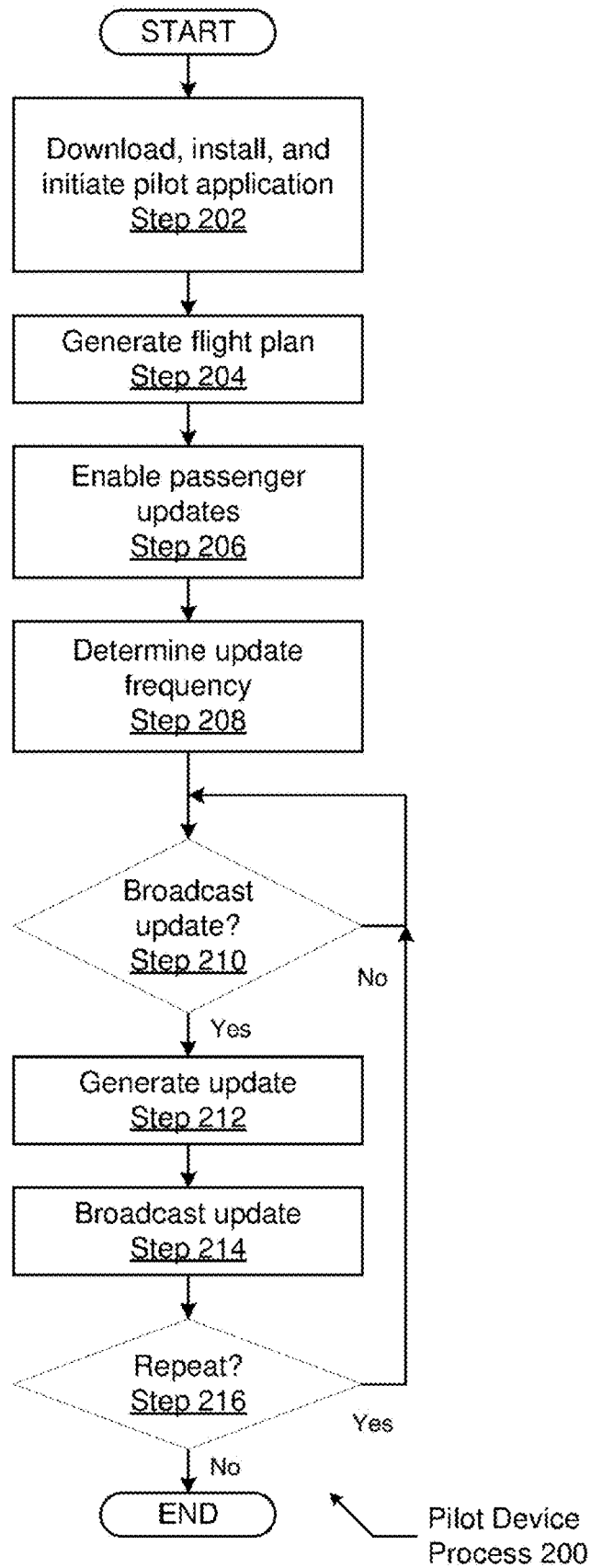

Turning to FIG. 2, the process (200) may be executed on a pilot device to synchronize flight information with one or more passenger devices. In Step 202, a pilot application is downloaded, installed, and initiated. In one or more embodiments, the pilot application is downloaded and installed using a mobile app distribution platform such as the App Store® for Apple® iOS devices from Apple Inc. of Cupertino, California or Google Play™ for Android™ devices from Google LLC of Mountain View, California After installation, the application may be initiated by selecting an icon from a home screen displayed on the pilot device. In one or more embodiments, initiation may be from selecting the application from within a folder, by a executing a command in a command line, or by using a finder application.

In Step 204, a flight plan is generated. In one or more embodiments, the pilot application is used to generate a flight plan on the pilot device. The flight plan identifies a route with zero or more waypoints between and including a departure airport and a destination airport using one or more airport identifier codes and location identifiers, such as those from the International Air Transport Association (IATA) or the International Civil Aviation Organization (ICAO). The flight plan may include additional information such as anticipated departure date and time, airspeed, altitude, etc. Waypoints may include navigation aids (e.g., Very High Frequency (VHF) Omni-Directional Range (VOR), non-directional (radio) beacon (NDB), etc.), GPS waypoint identifiers, airways, user-defined waypoints, etc.

In Step 206, passenger updates are enabled. In one or more embodiments, passenger updates are enabled on the pilot application through a settings screen with a user interface component, such as a check box component, that allows for toggling whether the passenger updates have been enabled. A value that indicates whether passenger updates have been enabled may be stored as a passenger update flag where a true value indicates that passenger updates have been enabled and a false value indicates that passenger updates have not been enabled.

In Step 208, an update frequency is determined. In one or more embodiments, the update frequency is determined by the pilot device with the pilot application based on one or more of the number of infrastructure mode connections and the amount of data transferred using the infrastructure mode connections (which may be measured in bits per second). When there are no infrastructure mode connections, a maximum update frequency with a minimum time between updates may be utilized. When at least one infrastructure mode connection is present, the update frequency may be scaled between the maximum update frequency and a minimum update frequency based on the amount of data transfer using the infrastructure mode connections. A higher update frequency is set if the network is not being used for other communications.

When a minimum amount of data traffic is present on the infrastructure mode connection (e.g., about 10 percent of available bandwidth), a higher update frequency is set. When a maximum amount of data traffic is present on the infrastructure mode connection (e.g., about 90 percent of available bandwidth), a lower update frequency is set. In one or more embodiments, the maximum update frequency is about once every five seconds and the minimum update frequency is about once every 20 seconds. In one or more embodiments, the update frequency is proportional to the ratio between the maximum amount of data traffic on the infrastructure mode connection to the current or average amount of data traffic on the instructor mode connection. In one or more embodiments, the update frequency is one of a set of discrete values (e.g., 5, 10, 15, or 20 seconds) selected based on the data traffic ratio satisfying one or more of a set of thresholds for the discrete values. When external devices are attached via Wi-Fi to the pilot device, the Wi-Fi connections are checked to see if the Wi-Fi connections use UDP (User Datagram Protocol) transmission. Since UDP does not guarantee packet delivery, data can be lost when the Wi-Fi chip switches temporarily to ad-hoc mode, and then back to infrastructure mode. Packets could be missed during that period (when not on the infrastructure connection). In this case, the pilot application will switch to ad-hoc less often to reduce the total percentage of packet loss from the infrastructure device.

In one or more embodiments, the update frequency is changed continuously. The update frequency may be changed continuously by continuously checking the current or average data traffic against the maximum data traffic and adjusting the update frequency based on the ratio of the maximum data traffic to the current or average data traffic. As an example, the adjustment may be performed by setting the update frequency to a value that is determined by multiplying the range of the update frequency by the ratio of the maximum amount of data traffic to the current amount of data traffic and then adding the minimum update frequency.

In one or more embodiments, the update frequency is changed periodically or in response to an event. The update frequency may be changed periodically by periodically checking the current date of traffic against the maximum data traffic. For example, the data traffic ratio may be checked about every 2 to 5 seconds. Additionally, the update frequency may be changed in response to an event, such as when an update timer has finished counting or waiting.

In Step 210, a determination on whether to broadcast an update is made. In one or more embodiments, the pilot application determines whether to broadcast the update based on several factors and thresholds. When the update is to be broadcast, the process proceeds to Step 212, otherwise, the process repeats back to Step 210.

Determining whether to broadcast the update may involve several steps based on several factors and thresholds. In one or more embodiments, the pilot application determines whether broadcasting has been enabled, which may be performed by checking the passenger update flag. When broadcasting has not been enabled, which may be determined by the passenger update flag being false, then the pilot device will not broadcast updates to the passenger devices. When all other conditions have been satisfied, enabling broadcasting by changing the pilot update flag may trigger the broadcast of an update.

In one or more embodiments, an update timer is checked. In one or more embodiments, the update timer is a timer that is started when the update frequency is determined or is started when a previous update is broadcast. The duration of the update timer is inversely proportional to the update frequency. After, or in response to, the update timer being met (by either counting up or counting down the update timer duration) the pilot device may broadcast an update.

In one or more embodiments, the pilot application determines whether broadcasting is required. The pilot application may maintain a broadcast required flag that is in addition to the passenger update flag. The broadcast required flag indicates that an update will be broadcast regardless of other considerations. In one or more embodiments, the broadcast requirement flag is checked after the passenger update flag and after the update timer has been met so that when both flags are true and the update timer has been met, the pilot device will broadcast an update without checking additional thresholds and considerations.

In one or more embodiments, the pilot application determines whether the pilot device meets one or more position based or flight thresholds. The flight thresholds may include a speed threshold and an altitude threshold. The speed threshold may be about 40 nautical miles per hour (knots), 60 miles per hour (mph), or 75 kilometers per hour (kph), though other values may be used. The altitude threshold may be based on the ground level at the location of the pilot device. In one or more embodiments, the altitude threshold is the ground level at the location of the pilot device, which may be checked against one or more terrain databases by the pilot application. The pilot application may determine that the pilot device is presently in an aircraft that is flying when the speed of the pilot device as measured by the satellite navigation system is greater than the speed threshold (e.g., about 40 knots) and the altitude of the pilot device is greater than the altitude threshold (e.g., above the current ground level at the location of the pilot device). The flight thresholds may be checked after the broadcast required flag so that the pilot application may determine to broadcast an update even though the broadcast is not required (as indicated by the broadcast required flag) when the flight thresholds have been satisfied.

In Step 212, the update is generated. In one or more embodiments, the pilot application generates the update with information from several sources using a sequence of steps.

In one or more embodiments, the pilot application device acquires navigation coordinates. The navigation coordinates may be from the satellite navigation receiver of the pilot device or may be from an avionics device, such as an ADS-B receiver.

In one or more embodiments, the pilot application retrieves current flight information. The current flight information may be from an active flight plan from the pilot application. The active flight plan identifies the waypoints for the route that the aircraft will take between the departure airport and the destination airport. The flight information may also include the airspeed and altitude of the aircraft. The airspeed and altitude may be retrieved from an avionics device of the aircraft. The current flight information may be converted to a format suitable for the passenger application. As an example, the waypoints of the route may be specified with location identifiers that are converted by the pilot application to longitude and latitude coordinates that are used by the passenger application for displaying the waypoints of the route on the passenger device.

In one or more embodiments, the pilot application acquires weather information. In one or more embodiments, the weather information may be received from the ADS-B receiver, which may receive the weather information from a flight information service broadcast (FIS-B) for weather and flight service information including airmen's meteorological information (AIRMETs), significant meteorological information AIM 7-1-6 reports (SIGMETs), meteorological aerodrome reports (METARs), special weather reports (SPECIs), national next-generation radar (NEXRAD), regional NEXRAD, distant notices to airmen (D-NOTAMs), flight data center (FDC) NOTAMs, pilot reports (PIREPs), special use airspace status, terminal area forecasts, amended terminal aerodrome forecasts (TAFs), winds, and temperature aloft.

In one or more embodiments, the pilot application determines an estimated time of arrival. The estimated time of arrival may be determined from one or more of the current navigation coordinates, the current flight route, and a previously planned route. A calculated estimated time of arrival is generated by the pilot application from the current navigation coordinates and the current route that is active within the pilot application.

Additionally, the pilot application may search the pilot device for previously planned routes that match the current route. A previously planned route matches the current route when the destination of the previously planned route is the same as the destination of the current route and when the previously planned estimated time of arrival satisfies a time threshold around the calculated estimated time of arrival. The previously planned route may match when the calculated estimated time of arrival is within six hours (before or after) of the previously planned estimated time of arrival. For example, when the previously planned estimated time of arrival is 3 pm, a match may occur when the calculated estimated time of arrival is between 9 am and 9 pm. After a previously planned route is found that matches the current route, the pilot application may select the shortest estimated time of arrival between the planned route estimated time of arrival and the calculated estimated time of arrival to be included in the update that will be transmitted to the passenger device.

In one or more embodiments, the pilot application identifies a time for the current update. The time may be a time stamp that includes one or more of the date and time and identifies when the update is created. The time stamp may be used with the timers discussed above to determine when an update should be broadcast.

In one or more embodiments, the pilot application determines a time for the next update. The time for the next update may be based on the update frequency. Additionally, the update frequency may be recalculated and adjusted based on the current conditions and network data traffic of the pilot device.

In one or more embodiments, the pilot application encodes one or more of the update and the information within the update. The encoding and encryption of the update prevents other applications from utilizing the information sent within the update. In one or more embodiments, the pilot device may encrypt the update so that any passenger application on any passenger device within range of the broadcast of the update from the pilot device may decrypt the update. In additional embodiments, the pilot application may generate a unique encryption key from user specified data (e.g., the phone number of a passenger that has downloaded the passenger application). The passenger application may generate a corresponding unique decryption key from the same user specified data. Using the unique encryption and decryption keys may prevent other users of the passenger application from decrypting the information within the update unless the information needed to generate the decryption key is provided to the other users.

In Step 214, the update is broadcast. In one or more embodiments, the pilot application broadcasts the update using the ad hoc mode. Broadcasting in the ad hoc mode may not require receipt of an acknowledgement from the passenger devices that receive the update from the pilot device. To broadcast the update, the pilot application may determine whether the pilot device is in the infrastructure mode or the ad hoc mode. When the pilot device is in the infrastructure mode, the pilot application may switch to the ad hoc mode. When the pilot device is in the ad hoc mode, the pilot application may broadcast the update. After broadcasting the update, the pilot application may switch the pilot device back to the infrastructure mode when the pilot device was in the infrastructure mode prior to broadcasting the update. Switching between the ad hoc mode and the infrastructure mode may be performed by sending a command to the wireless controller of the pilot device that causes the wireless controller to operate in the mode specified in the command.

In Step 216, a determination is made on whether to repeat. In one or more embodiments, the pilot application determines whether to repeat back and broadcast another update. When another broadcast is to be transmitted, the process may repeat back to Step 210. Otherwise, the process ends. The process may repeat back when broadcasting updates is enabled, which may be when the passenger update flag is true.

Turning to FIG. 3, the process (300) may be executed on a passenger device to receive and display flight information from a pilot device. In Step 302, a passenger application is downloaded, installed, and initiated. In one or more embodiments, the passenger application operates with zero configuration from the user so that the user of the passenger application may run the passenger application and receive and display updates from a pilot device without providing configuration information (e.g., the name, identity, or address of a pilot device) to the passenger application. In one or more embodiments, the passenger application is downloaded and installed using a mobile app distribution platform such as the App Store® for Apple® iOS devices from Apple Inc. of Cupertino, California or Google Play™ for Android™ devices from Google LLC of Mountain View, California.

After installation, the passenger application may be initiated by selecting an icon from a home screen displayed on the passenger device. In one or more embodiments, after initiating the passenger application, the passenger application displays a map. The map may be centered on one or more of the present location of the aircraft (and the passenger device), the route between the departure and destination airports, one of the waypoints, and one of the airports. The map may be panned and zoomed based on interaction between the user and one or more graphical user interface components.

In Step 304, a decision is made on whether an update has been acquired. In one or more embodiments, the passenger application makes the determination in response to receiving an ad hoc broadcast. Wireless network devices other than the pilot device may transmit a broadcast that is received by the passenger device using the ad hoc mode. In response, the passenger device may filter broadcasts to identify the broadcasts that are updates from the pilot device, which is further described with FIG. 4. When an update has been acquired, the process proceeds to Step 306. Otherwise, the process loops back to repeat Step 304.

In Step 306, a display is refreshed based on the update. In one or more embodiments, the passenger application refreshes the display on the passenger device with the information from the update. The updated information may include route information, weather information, the estimated time of arrival, and the location of the aircraft. When the passenger device does not include a satellite navigation receiver, or is otherwise unable to generate navigation coordinates, the passenger device may use the navigation coordinates received from the pilot device in the update as the present location of the aircraft that is displayed on the map on the passenger device.

Turning to FIG. 4, the process (400) may be executed on a passenger device to determine whether an update has been appropriately acquired. In Step 402, the passenger device switches to the ad hoc mode. In one or more embodiments, the passenger device switches to the ad hoc mode when the wireless controller of the passenger device is in the infrastructure mode so that the passenger device may receive the broadcast. Switching between the ad hoc mode and the infrastructure mode may be performed by sending a command to the wireless controller of the passenger device that causes the wireless controller to operate in the mode specified in the command, i.e., in the ad hoc mode instead of in the infrastructure mode.

In Step 404, an ad hoc broadcast is received. In one or more embodiments, the wireless controller of the passenger device listens for and receives any ad hoc broadcast from any number of devices that are sending broadcasts using the ad hoc mode, which may include pilot devices, other passenger devices, other mobile devices, other wireless devices, etc.

In Step 406, the ad hoc broadcast is recognized as an update. In one or more embodiments, the passenger application recognizes the broadcast as an update from a pilot device. Recognition of the broadcast as an update may be performed by scanning a header of the broadcast for an identifier that indicates the broadcast is an update generated by a pilot application from a pilot device. For example, the identifier may be a universally unique identifier (UUID) that identifies the pilot application, but which may not identify the particular pilot device that sent the update. The UUID may be identified by the passenger application after scanning the header of the broadcast. In one or more embodiments, the passenger application recognizes the ad hoc broadcast as an update from the pilot device without configuring the passenger application with information identifying the pilot device.

In Step 408, a determination is made on whether the update is from a preferred pilot. In one or more embodiments, the passenger device listens for and receives updates from multiple pilot devices that broadcast using the ad hoc mode using the same UUID. When there are multiple pilot devices, the passenger device may select one of the pilot devices to be identified as a preferred pilot. The preferred pilot may be identified as the pilot device that provides the first update that is received by the passenger device. After setting the preferred pilot, the passenger application may only show updates that are from the preferred pilot. Additionally, the passenger application may record identifiers from the pilot devices (including the preferred pilot) that send updates, display a listing of the pilot devices, and provide a graphical user interface for the user to select which pilot device is the preferred pilot. When the update is from the preferred pilot, the process continues and may go to Step 306 of FIG. 3. Otherwise, when the update is not from the preferred pilot, the process continues to Step 410.

In Step 410, a determination is made on whether the preferred pilot has timed out. In one or more embodiments, a timer is started after previously receiving an update from the preferred pilot. If a subsequent update from the preferred pilot is not received before the timer runs out (i.e., a timeout threshold is satisfied), then the passenger application may set a new preferred pilot. In one or more embodiments, the timeout threshold for the preferred pilot may be selected from the range of about 1 minute to about 5 minutes, though other values may be used. When the timer has not run out, the process may proceed back to Step 404 and wait for a subsequent update. Otherwise the process may proceed to Step 412.

In Step 412, the preferred pilot is set. In one or more embodiments, when the update is not from a previous pilot device that was identified as the preferred pilot and the update is received after timeout threshold has been satisfied, then the passenger device may set the preferred pilot as the pilot device which sent the update that is currently being processed and which is different from the previous pilot device that was identified as the preferred pilot. After setting the preferred pilot, the process may continue to Step 306 of FIG. 3.

Figure 5:
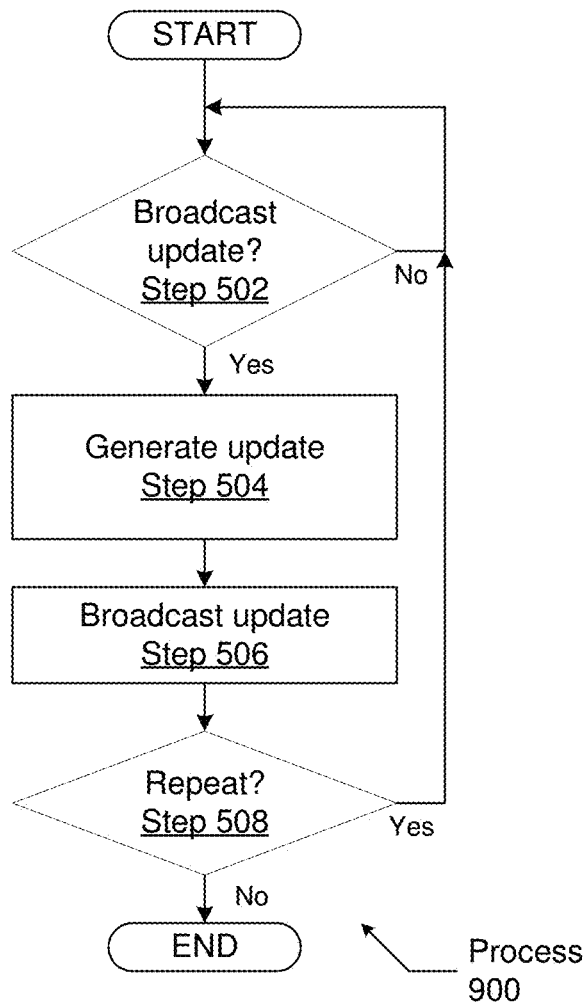

Turning to FIG. 5, the process (500) may be executed on a passenger device to broadcast updates to other passenger devices. In Step 502, a determination on whether to broadcast an update is made. In one or more embodiments, the passenger application determines whether to broadcast the update based on several factors and thresholds, which are similar to those described with regard to Step 210 of FIG. 2. The update timer for the passenger application may differ from the update timer for the pilot application so that the passenger device may broadcast updates more (or less) frequently than the pilot device. When the update is to be broadcast, the process proceeds to Step 504, otherwise, the process repeats back to Step 502.

In Step 504, the update is generated. In one or more embodiments, the passenger application generates the update from the previously received update from the pilot device. The update may differ from the previously received update by the inclusion of information generated by the passenger device. For example, the update may include navigation coordinates generated by the passenger device that may be updated more frequently than the navigation coordinates from the previously received update.

In Step 506, the update is broadcast. In one or more embodiments, the passenger application broadcasts the update using the ad hoc mode. If the passenger device is not already in the ad hoc mode, the passenger device switches to the ad hoc mode to broadcast the update.

In Step 508, a determination is made on whether to repeat. In one or more embodiments, the passenger application determines whether to repeat back and broadcast another update. When another broadcast is to be transmitted, the process may repeat back to Step 502. Otherwise, the process ends. The process may repeat back when broadcasting updates is enabled, which may be when the passenger broadcast flag is true.

Figure 6:
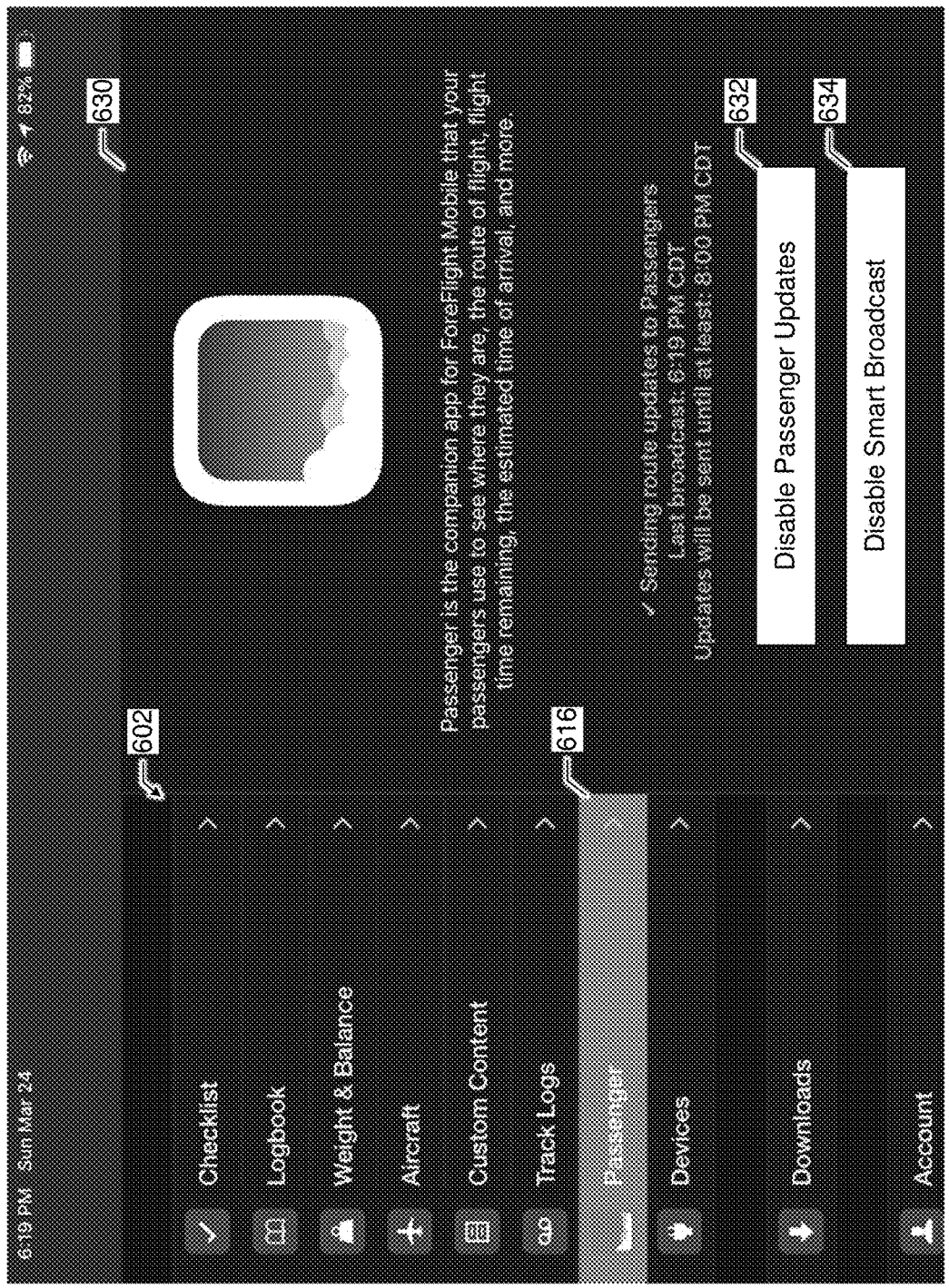
FIG. 6 and FIG. 7 show examples of user interfaces in accordance with disclosed embodiments.
Figure 7:
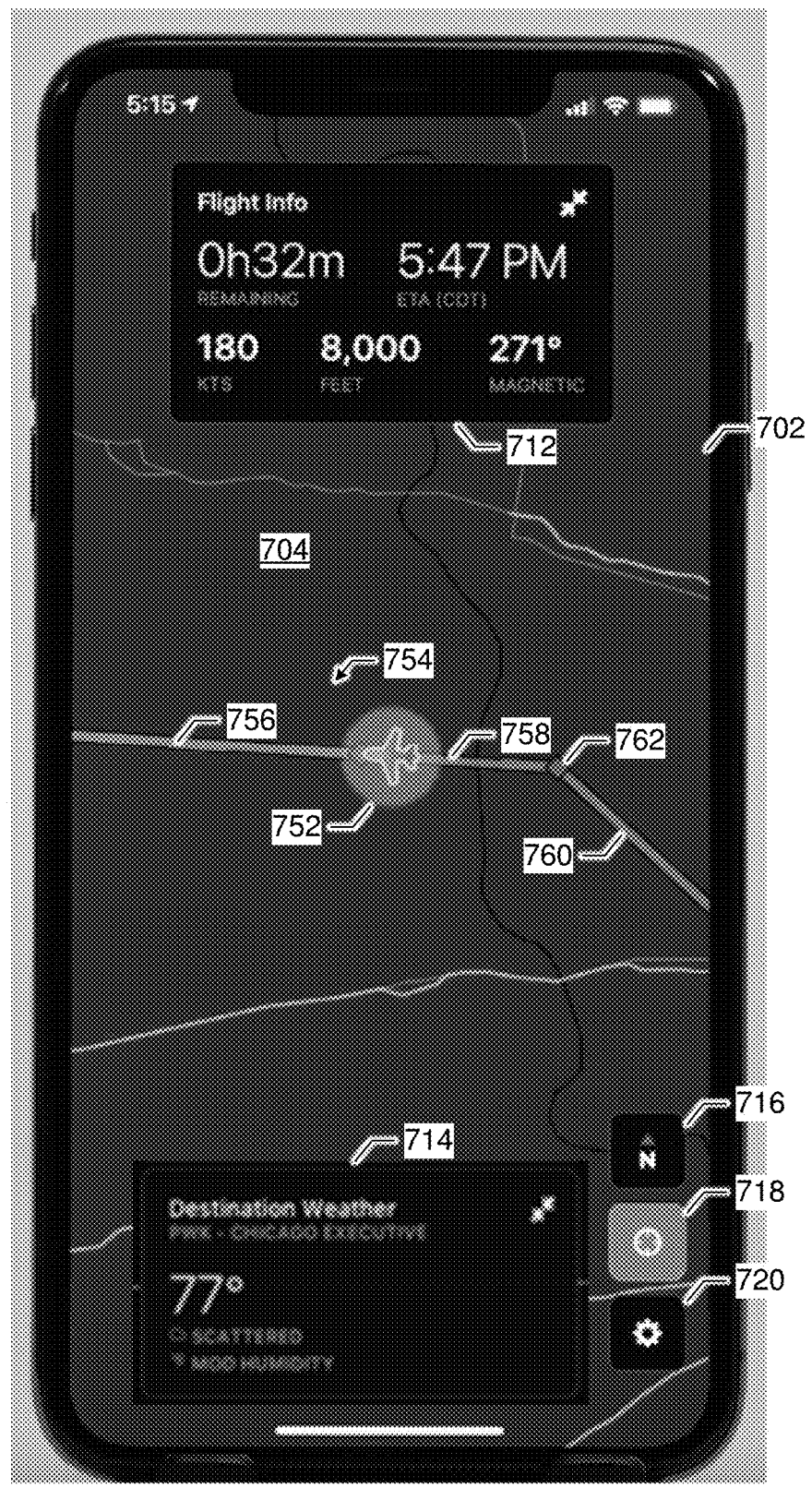

FIG. 6 and FIG. 7 show diagrams of graphical user interfaces in accordance with the disclosure. The various elements, widgets, and components shown in FIGS. 6 and 7 may be omitted, repeated, combined, and/or altered as shown from FIGS. 6 and 7. Accordingly, the scope of the present disclosure should not be considered limited to the specific arrangements shown in FIGS. 6 and 7.

Turning to FIG. 6, the user interface (600) is a graphical user interface displayed by a pilot application on a pilot device. The user interface (600) includes a set of graphical user interface components (602) through (634) that are operated by a user to interact with the pilot application.

The list (602) is a component of the user interface (602) that exposes the functionality available within the pilot application. The list (602) includes a number of selectable items. The component (616) is selected which triggers the display of the window (630) to adjust the settings for passenger updates.

The window (630) displays information about passenger update broadcasts and includes the components (632) and (634) that control the broadcast of updates from the pilot device. The window (630) indicates that the pilot application is currently configured to send route updates, that the last broadcast was at "6:19 PM CDT" and that updates will be sent until at least "8:00 PM CDT". In one or more embodiments, the cutoff time of "8:00 PM CDT" for when passenger updates will automatically be disabled is selected when the passenger updates are enabled with the component (632).

The button (632) is a user interface component that toggles whether the broadcast of passenger updates is enabled. The component (632) includes the text "Disable Passenger Updates" to indicate that passenger updates are currently enabled and that selecting the component (632) will disable the broadcast of future passenger updates. When passenger updates are disabled, the text in the component (632) may change to state "Enable Passenger Updates".

Selecting the component (632) to enable passenger updates may trigger the selection of when the passenger updates will automatically be disabled. For example the pilot application may check the estimated time of arrival for current flight information, add a buffer of 20 minutes to the estimated time of arrival to form a buffered time of arrival, and round the buffered time of arrival up to the nearest half hour to form the cut off time for broadcasting the passenger updates.

The button (634) is a user interface component that toggles whether the smart broadcast feature is enabled. In one or more embodiments, the smart broadcast feature may be enabled by default. With the smart broadcast feature, the pilot application determines whether the pilot device is flying in an aircraft before broadcasting updates to passengers. For example, the pilot application may check the speed and altitude of the pilot device to determine whether the pilot device is flying in an aircraft. When the smart broadcast feature is disabled, broadcasting is required regardless of whether the pilot device is flying in an aircraft.

Turning to FIG. 7, the user interface (702) is a graphical user interface displayed by a passenger application on the passenger device (700). The user interface (702) includes a set of graphical user interface components (712) through (762) that are operated by a user to interact with the passenger application.

The passenger device (700) executes the passenger application and displays the user interface (702). In one or more embodiments, the passenger device (700) is a smartphone that includes a touch sensitive display.

The map (704) is displayed within the user interface (702). In one or more embodiments, the map (704) is a geographic map that includes the borders and names for one or more cities and countries. The maps may be downloaded as part of the passenger application to preclude having to download additional maps for different routs during a flight.

The flight information window (712) is a component of the user interface that displays current flight information including one or more of the time remaining ("0h32m"), the time of arrival ("5:47 PM"), the speed (180 Knots), the altitude (8,000 feet), and the heading of the aircraft (271 degrees from magnetic North). The time remaining for the flight may be calculated by subtracting the current time from the estimated time of arrival. The estimated time of arrival may be calculated using the current speed and the distance to the destination airport or may be taken from the estimated time of arrival provided in the update from the pilot device.

The weather information window (714) is a component of the user interface (702) that displays current weather information including one or more of the temperature (77 degrees), cloud cover ("SCATTERED"), and humidity ("MOD HUMIDITY"). The weather information window (714) may be context sensitive to show weather information for different locations selected in the map (704).

The map direction button (716) is a component of the user interface (702). Selection of the map direction button (716) switches between having the Northern side of the map (704) at the top of the view of the user interface (702) and having the heading of the aircraft being the top of the view so that the aircraft icon (752) points up towards the top of the passenger device (700).

The focus button (718) is a component of the user interface (702). In one or more embodiments, selecting the focus button (718) transitions the view of the map (704) in the user interface (702) to center the map (704) on a selected location by panning and zooming the view of the map (704). The selected location may be selected from a list of locations that is displayed in response to pressing the focus button (718). The list of locations may include: the location of the aircraft, the location of a waypoint on the map, the location of an airport, the route, and a segment of the route.

The settings button (720) is a component of the user interface (702) to manipulate the settings of the passenger application. In one or more embodiments, selecting the settings button brings up a menu from which a user may select the types of flight and information to display, the types of weather information, and the source location of the weather information (e.g., the departure airport, the current location of the aircraft, the destination airport, a waypoint, etc.).

The aircraft icon (752) is a component of the user interface (702) that identifies the location of the aircraft on the map (704) and identifies the location of the aircraft in the current segment of the route (754). In one or more embodiments, the angle of the aircraft icon (752) with respect to the map (704) indicates the direction of travel of the aircraft. When the view of the map (704) is centered on the aircraft, the view of the map (704) may be continuously updated to keep the display of the aircraft at the center of the screen of the passenger device (700).

The route indicator (754) represents the route between the departure airport and the destination airport. The route may be composed of one or more incomplete segments and completed segments. Additionally, the current segment may be identified on the route. The incomplete segment indicator (756) is a user interface component that represents an incomplete segment of the route (754). The current segment indicator (758) is a user interface component that represents a current segment of the route (754) and shows the current progress of the current segment. The completed segment indicator (760) is a user interface component that represents a completed segment of the route (754). The waypoint indicator (762) is a user interface component that represents a waypoint. In one or more embodiments, the indicators for the incomplete segments, current segment, the complete segments may be shown on the map (704) using different colors.

Figure 8A:
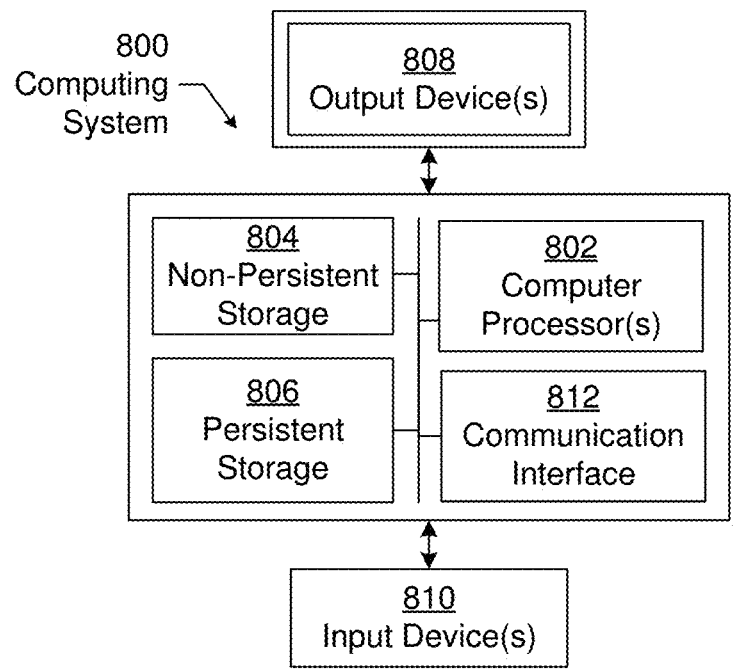
FIG. 8A and FIG. 8B show computing systems in accordance with disclosed embodiments.

Embodiments may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 8B:
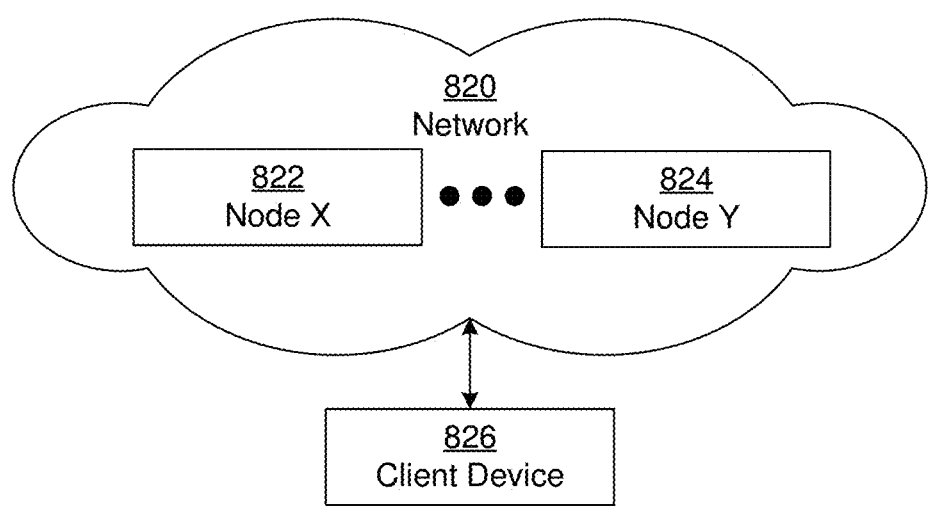

The computing system (800) in FIG. 8A may be connected to or be a part of a network. For example, as shown in FIG. 8B, the network (820) may include multiple nodes (e.g., node X (822), node Y (824)). Nodes may correspond to a computing system, such as the computing system shown in FIG. 8A, or a group of nodes combined may correspond to the computing system shown in FIG. 8A. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform at least a portion of one or more embodiments of the disclosure.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system.

For example, the computing system of FIG. 8A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A method comprising:
    enabling a broadcast of an update to a passenger device from a pilot device, wherein the passenger device and the pilot device are located on an aircraft;
    determining an update frequency for the broadcast of the update from one or more network thresholds;
    determining to broadcast the update when the broadcast is enabled and one or more broadcast thresholds are satisfied;
    generating the update, wherein the update includes an estimated time of arrival (ETA), wherein the update is received by the pilot device operating in an infrastructure mode from an avionics device on the aircraft using a wireless access point of the avionics device, and wherein the avionics device comprises an automatic dependent surveillance-broadcast (ADS-B) receiver for receiving air traffic and weather information; and
    broadcasting the update by switching between the infrastructure mode and an ad hoc mode and transmitting the update via the ad hoc mode, wherein the ad hoc mode enables the pilot device to interface with the passenger device directly, and wherein the update is received by and displayed on the passenger device.

2. The method of claim 1, further comprising:
    acquiring the weather information using the infrastructure mode; and
    transmitting the weather information to the passenger device using the ad hoc mode.

3. The method of claim 1, further comprising:
    identifying an update time for the update to identify when the update is sent to the passenger device; and
    determining a next update time from the update time, the update frequency, and the one or more network thresholds.

4. The method of claim 1, further comprising:
    determining to broadcast the update when a speed determination of the pilot device is greater than a flight speed broadcast threshold.

5. The method of claim 1, further comprising:
    determining to broadcast the update when an altitude determination of the pilot device is greater than an altitude broadcast threshold.

6. The method of claim 1, further comprising:
    selecting the ETA from one of a calculated ETA calculated from current flight information and a precalculated ETA from a flight plan.

7. The method of claim 1, further comprising:
    switching back to the infrastructure mode from the ad hoc mode after broadcasting the update.

8. A method comprising:
    switching, by a passenger application on a passenger device, to an ad hoc mode to receive an update from a pilot device for the passenger application, wherein:
        the ad hoc mode enables the pilot device to interface with the passenger device directly;
        the passenger device and the pilot device are located on an aircraft; and
        the update is received by the pilot device operating in an infrastructure mode from an avionics device on the aircraft using a wireless access point of the avionics device, and wherein the avionics device comprises an automatic dependent surveillance-broadcast (ADS-B) receiver for receiving air traffic and weather information;
    receiving an ad hoc broadcast;
    recognizing the ad hoc broadcast as the update from the pilot device without configuring the passenger application with information identifying the pilot device;
    generating, by the passenger application, display information that includes route information generated from the update; and
    refreshing, by the passenger application, a user interface on the passenger device with the display information, wherein the user interface displays a map, a route with one or more segments, and an estimated time of arrival (ETA).

9. The method of claim 8, wherein recognizing the ad hoc broadcast further comprises:
    determining that the update is not from a previous pilot device that was identified as a preferred pilot;
    determining that a timeout threshold for the preferred pilot is satisfied when the update is received outside of the timeout threshold after a previous update from the previous pilot device; and
    setting the pilot device as the preferred pilot when the timeout threshold is satisfied.

10. The method of claim 8, further comprising:
enabling a broadcast of a subsequent update to a subsequent passenger device from the passenger device, wherein the subsequent update includes information from the update;
determining an update frequency for the broadcast of the subsequent update from one or more network thresholds;
determining to broadcast the subsequent update when the broadcast is enabled and one or more broadcast thresholds are satisfied; and
broadcasting the subsequent update by transmitting the subsequent update using the ad hoc mode, wherein the subsequent update is received by and displayed on the subsequent passenger device.

11. The method of claim 10, further comprising:
identifying an update time for the subsequent update to identify when the subsequent update is sent to the subsequent passenger device; and
determining a next update time from the update time, the update frequency, and the one or more network thresholds.

12. The method of claim 10, further comprising:
determining to broadcast the subsequent update when a speed determination of the passenger device is greater than a flight speed broadcast threshold.

13. The method of claim 10, further comprising:
determining to broadcast the subsequent update when an altitude determination of the passenger device is greater than an altitude broadcast threshold.

14. The method of claim 10, further comprising:
determining to broadcast the subsequent update when a next update will be received by the passenger device from the pilot device outside of a broadcast threshold.

15. A system that forms a pilot device, comprising:
a processor;
a memory coupled to the processor;
the memory comprising a pilot application that executes on the processor, uses the memory, and is configured for:
enabling a broadcast of an update to a passenger device from the pilot device, wherein the passenger device and the pilot device are located on an aircraft;
determining an update frequency for the broadcast of the update from one or more network thresholds;
determining to broadcast the update when the broadcast is enabled and one or more broadcast thresholds are satisfied;
generating the update, wherein the update includes an estimated time of arrival (ETA), wherein the update is received by the pilot device operating in an infrastructure mode from an avionics device on the aircraft using a wireless access point of the avionics device, and wherein the avionics device comprises an automatic dependent surveillance-broadcast (ADS-B) receiver for receiving air traffic and weather information; and
broadcasting the update by switching between the infrastructure mode and an ad hoc mode and transmitting the update via the ad hoc mode, wherein the ad hoc mode enables the pilot device to interface with the passenger device directly, and wherein the update is received by and displayed on the passenger device.

16. The system of claim 15, wherein the pilot application is further configured for:
acquiring the weather information using the infrastructure mode; and
transmitting the weather information to the passenger device using the ad hoc mode.

17. The system of claim 15, wherein the pilot application is further configured for:
identifying an update time for the update to identify when the update is sent to the passenger device; and
determining a next update time from the update time, the update frequency, and the one or more network thresholds.

18. The system of claim 15, wherein the pilot application is further configured for:
determining to broadcast the update when a speed determination of the pilot device is greater than a flight speed broadcast threshold.

19. The system of claim 15, wherein the pilot application is further configured for:
determining to broadcast the update when an altitude determination of the pilot device is greater than an altitude broadcast threshold.

20. The system of claim 15, wherein the pilot application is further configured for:
selecting the ETA from one of a calculated ETA calculated from current flight information and a precalculated ETA from a flight plan.

* * * * *